(12) United States Patent
Arnon et al.

(10) Patent No.: US 12,422,235 B2
(45) Date of Patent: Sep. 23, 2025

(54) OPTICAL SPECTRUM LIGHT-CURABLE CARTRIDGE CASE SEALANT METHOD AND APPARATUS

(71) Applicant: Hernon Manufacturing, Inc., Sanford, FL (US)

(72) Inventors: Harry Arnon, Longwood, FL (US);
Josef Arnon, Longwood, FL (US);
Seda Edizer Borak, Sanford, FL (US);
Kyle J. Cassidy, Sanford, FL (US)

(73) Assignee: Hernon Manufacturing, Inc., Sanford, FL (US)

(*) Notice: Subject to any disclaimer, the term of this patent is extended or adjusted under 35 U.S.C. 154(b) by 6 days.

(21) Appl. No.: 18/393,528

(22) Filed: Dec. 21, 2023

(65) Prior Publication Data
US 2024/0219156 A1 Jul. 4, 2024

Related U.S. Application Data

(60) Provisional application No. 63/477,499, filed on Dec. 28, 2022.

(51) Int. Cl.
*F42B 33/00* (2006.01)
*F42B 5/067* (2006.01)
*F42B 5/196* (2006.01)
*F42B 5/295* (2006.01)
*F42B 5/297* (2006.01)
*F42B 33/14* (2006.01)

(52) U.S. Cl.
CPC ............ *F42B 33/001* (2013.01); *F42B 5/067* (2013.01); *F42B 33/14* (2013.01); *F42B 5/196* (2013.01); *F42B 5/295* (2013.01); *F42B 5/297* (2013.01)

(58) Field of Classification Search
CPC ........ F42B 5/067; F42B 33/00; F42B 33/001; F42B 5/196; F42B 5/295; F42B 5/297; F42B 3/28; F42B 33/14
USPC ..................... 86/19.5, 43, 17, 19.7
See application file for complete search history.

(56) References Cited

U.S. PATENT DOCUMENTS

| | | | | |
|---|---|---|---|---|
| 5,256,203 A * | 10/1993 | Moore | .................. | B05C 5/0212 118/302 |
| 7,032,492 B2 * | 4/2006 | Meshirer | ............... | F42B 33/001 86/43 |
| 10,422,614 B2 * | 9/2019 | Hemsen | ................ | F42B 33/001 |
| 10,907,943 B2 * | 2/2021 | Beach | ...................... | F42B 5/307 |
| 11,009,328 B1 * | 5/2021 | Arnon | .................. | F42B 33/001 |
| 2020/0124387 A1 * | 4/2020 | Arnon | ..................... | F42B 33/00 |
| 2021/0348902 A1 * | 11/2021 | Burrow | ................. | F42B 33/001 |

* cited by examiner

*Primary Examiner* — James S Bergin
(74) *Attorney, Agent, or Firm* — PARSONS & GOLTRY; Robert A. Parsons; Michael W. Goltry

(57) ABSTRACT

A method of sealing an ammunition cartridge during an ammunition manufacturing process. The method including providing a cartridge case having a projectile receiving mouth with an inner surface and applying a thin circumferential film of a liquid light curable sealant to the inner surface. A cured thin circumferential film is formed by curing the thin circumferential film of liquid light curable sealant using an effective curing light from an optical light spectrum. A projectile is inserted into the mouth of the cartridge case with the cured thin circumferential film forming an air and moisture impermeable seal between the inner surface and the projectile.

7 Claims, 5 Drawing Sheets

OPTICAL SPECTRUM LIGHT-CURABLE CARTRIDGE CASE SEALANT METHOD AND APPARATUS

CROSS-REFERENCE TO RELATED APPLICATIONS

This application claims the benefit of U.S. Provisional Patent Application No. 63/477,499, filed 28 Dec. 2022.

FILED OF THE INVENTION

The present invention relates to an improvement in the ammunition sealing art, and more particularly, to a cartridge case mouth sealing method and system that utilizes an optical spectrum light-cured sealant and effective optical spectrum light source(s) that provide curing capabilities.

BACKGROUND OF THE INVENTION

In ordinary ammunition manufacture, a projectile is sealed to a mouth of a cartridge casing after gun powder is loaded into the casing. A conventional method of sealing a projectile to an ammunition casing involves applying a liquid sealant, such as bitumen, to the mouth of the casing and then drying the applied sealant. A recurrent problem with providing a useful seal at the seam between the casing and the projectile for the ammunition is the disadvantage of using asphaltic formulations. These substances are divided into two categories, emulsions (water-based) and solvent-based. Each of these types have distinct disadvantages to use in production. Solvent-based asphalt solutions have high volatile organic compound (VOC) content which poses health hazards due to poor air quality as the solvent evaporates. Asphaltic emulsion are very difficult to handle and keep clean within automated pieces of machinery and take an extraordinary length of time for drying and curing (in many cases up to 40 hours or more). This amount of time in an automated process is no longer acceptable, as the need to increase production speed is of vital importance for any munitions facility.

Another problem with current sealing techniques is irregular sealing. Lack of proper sealing at the seam between the casing and the projectile can result in ingress of moisture which is detrimental to the operation and reliability of the ammunition and can greatly compromise the safety of the ammunition during storage and eventual use. There is also inconsistency in the performance of an irregularly sealed cartridge, due to differing thickness of the layer from the application process or drying. This can also result in variability in the final "pull out" force, or the force required to remove the projectile from its casing. This force is measured in a standard Instron pull test using a set of modified jaws to hold the top and base portions of the projectile in order to be able to reproduce the force required and to reproduce the test data.

In the manufacture of ammunition, the bullet or projectile is inserted into the open end of a casing that also contains the propellant powder charge and primer. Though the projectile is designed to fit tightly into the casing opening, a small gap remains at the interface between the casing and the bullet/projectile. This gap is where the ability to initially seal the bullet/projectile within the casing is critical and where the time required using bitumen has always been a bane of the munitions industry. It is also a space or gap where undesirable ingress of moisture or other contaminates can occur.

The most commonly known methods of sealing a projectile to an ammunition casing involves applying a liquid sealant to the mouth of the casing and then drying the applied sealant by one or more methods such as blow drying. Conventional blow-drying is time consuming and often noisy. The heating temperature is also extremely difficult to control. While improvements have been made in the rate at which sealant can be dried including by using, for example, multiple high-powered heaters. In all cases, the drying of messy and toxic asphaltic emulsions such as bitumen sealant at the case or casing mouth has remained an extremely slow batch process. Further improvements are possible.

More specifically, the traditional technique for sealing small-caliber ammunition has been application of an asphalt-based sealant applied to the inside of the mouth of the casing prior to the propellant powder being loaded into the casing but before the bullet/projectile is inserted. Then the asphalt-based sealant has to dry before it goes to the loading phase, where the same equipment is used to load the propellant and insert the projectile. This technique is unsatisfactory for many reasons. First, as the bullet/projectile is inserted into the casing after the application and drying of the sealant, much of the sealant is pushed downwardly into the casing, thereby displacing the sealant and reducing any sealing ability. This leads to providing waste of the sealant material. Also, due to the displacement of the sealant into the casing compartment by the bullet/projectile, the gap between the bullet/projectile and the casing often does not completely cover the circumference of the bullet/projectile at the interface with the casing. Another problem is the sealant pushed into the cartridge can cause agglomeration of the powder it contacts, thereby interfering with the desired homogeneous character and proper repeatable firing of the powder charge. As the charge is ignited (in subsequent use of the ammunition) much of the sealant does not ignite and is deposited in the weapon during firing. The resulting residue often interferes with the subsequent operation of the weapon and complicates the cleaning and maintenance of the weapon after its use. Finally, the chlorinated solvent(s) in which the asphaltic emulsion sealant is dissolved, has been determined to be toxic which provides an inhalation hazard to the end-user. The solvents of asphaltic emulsions require expensive and continuous ventilation to ensure user safety. Due to the volatility of the solvents, increased solvent evaporation occurs causing shrinkage and viscosity variations resulting during tacking and bonding of the bullet/projectile at the interface with the casing.

As also alluded to above, the use of asphalt-based emulsions in production line application machines can be extremely messy, time consuming, and costly. For certain application equipment, there are simply 1-2 sealant reservoirs, but there are specific applications where many valves exist for high-speed production (often dozens). These machines must be cleaned each day, requiring a long pause in production as well as increasing safety risk(s).

In an attempt to overcome these issues, a process has been developed using sealant on a cartridge case with a projectile already in position. U.S. Pat. No. 6,367,386 issued Apr. 9, 2002 and U.S. Pat. No. 6,584,909 issued Jul. 1, 2003 disclose a method in which a liquid with high capillary action, consisting of acrylate-based anaerobic adhesive sealing agent is applied to the gap of the fully manufactured cartridge. The sealant is applied to the joint between the case and the projectile carried therein. The sealant liquid is drawn into the joint through capillary action and cures in the absence of oxygen with the presence of an active metal. This method is unsatisfactory for various reasons, including the fact that anaerobic adhesives behave inconsistently. They can solidify during application, resulting in the total loss of costly processing equipment. Due to differences in manufacturing equipment, processing speeds, process temperature conditions and metals, gaps between cartridges and projectiles are rarely identical. As a result of this structural variation, anaerobic adhesives do not seal with a uniform degree of adhesion. Occasionally the seal of the projectile to the cartridge is too strong, causing the weapon to explode. When relatively large gaps occur the presence of oxygen can prevent the cure of the anaerobic adhesive, resulting in an unprotected cartridge.

It would be highly advantageous, therefore, to remedy the foregoing and other deficiencies inherent in the prior art.

An object of the present invention is to provide a method and system to efficiently and regularly seal ammunition cartridges using optical spectrum light cured sealants.

SUMMARY OF THE INVENTION

Briefly to achieve the desired objects and advantages of the instant invention in accordance with a preferred embodiment provided is a method of sealing an ammunition cartridge during an ammunition manufacturing process. The method includes the steps of providing a cartridge case having a projectile receiving mouth with an inner surface and applying a thin circumferential film of a liquid light curable sealant to the inner surface. A cured thin circumferential film is formed by curing, through irradiation, the thin circumferential film of liquid light curable sealant using an effective curing light from an optical light spectrum. The ammunition cartridge is then assembled. Assembling the ammunition cartridge includes inserting a projectile into the mouth of the cartridge case with the cured thin circumferential film forming an air and moisture impermeable seal between the inner surface and the projectile.

Also provided is a system for sealing an ammunition cartridge during an ammunition manufacturing process. The system includes a plurality of cartridge cases each having a projectile receiving mouth with an inner surface. A liquid sealant applicator fixture sequentially receives each of the plurality of cartridge cases and applies a thin circumferential film of a liquid light curable sealant to the inner surface of each of the plurality of cartridge cases. An effective curing light source is sequentially positioning proximate each mouth of the plurality of cartridge cases. A cured thin circumferential film is formed on the inner surface of each of the plurality of cartridge cases from the thin circumferential film of liquid light curable sealant subjected to the effective curing light from an optical light spectrum.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION

Figures 1, 2:
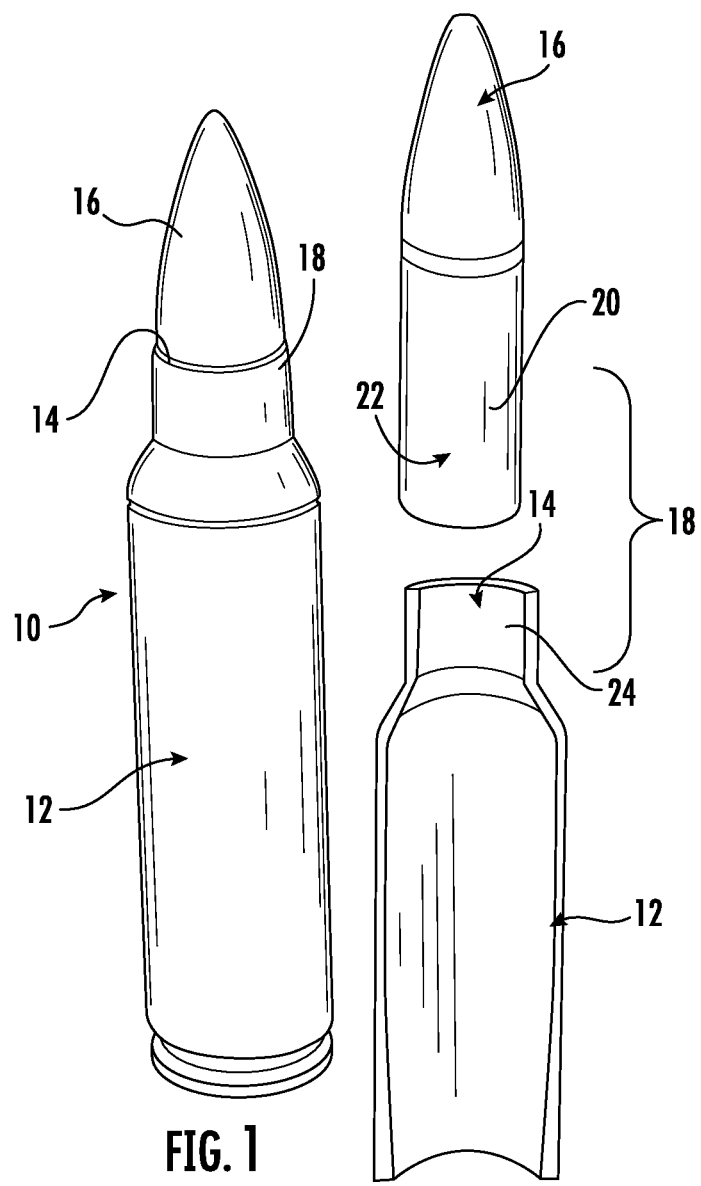
FIG. 1 is a side view of an ammunition a cartridge.
FIG. 2 is a sectional side view of the cartridge case of FIG. 1 and associated projectile separated therefrom.

Turning now to the drawings in which like reference characters indicate corresponding elements throughout the several views, attention is directed to FIG. 1 which illustrates an assembled ammunition cartridge 10. Cartridge 10 includes a cartridge case 12 having a mouth 14, and a projectile 16 having a base portion carried within mouth 14. A joint 18 between case 12 and projectile 16 is the area of concern for the present invention. With additional reference to FIG. 2, a cross section of case 12 and associated projectile 16 are illustrated. Joint 18 is formed between an outer surface 20 of base portion 22 of projectile 16 and an inner surface 24 of mouth 14 of case 12. The interface between the inner surface 24 of mouth 14 and outer surface 20 of projectile 16 must be sealed or cartridge performance is greatly reduced or may not work at all. Thus, as described previously, sealants are employed to seal this interface in joint 18.

The present invention is based on the novel idea that the interface between projectile 16 and casing 12 of an ammunition article (cartridge) can be efficiently sealed, in a reliable, uniform and reproducible manner, by utilizing a light-curable sealant that is applied to inner surface 24 of case 12 which forms a portion of joint 18 between projectile 16 and the casing 12. As used in the present application, the term "optical light spectrum" is defined to include the ultraviolet parts of the electromagnetic spectrum as well as visible light. According to the present invention, the optical spectrum light-curable sealant (light-curable sealant) is applied as a liquid in a thin circumferential film on inner surface 24 and subsequently light-cured, preferably using Ultra-Violet light (UV), to harden the liquid into a malleable layer. Curing the light-curable sealant using UV-light irradiation provides a quick, uniform and safe curing process as well as producing a moisture-resistant seal. Other sealants cured by other optical spectrum light can also be employed. The light-curable sealants of the present invention are formulated to provide liquid thin film application to inner surface 24 of joint 18 so that the amount of light curable sealant required for reliable, reproducible sustainable sealing of the final product (munitions article) is optimized. By curing the sealant along inner surface 24 of casing 12 prior to insertion of the projectile, the operation is more robust, maintains a consistent thin film thickness and is more efficient than any other previously attempted system. In addition, the moisture-resistant seal effectively blocks moisture penetration into the interior compartment of casing 12 while maintaining dry conditions of the powder charge and primer in the cartridge. Further, since light-curable sealants are amenable to extremely rapid curing in exposure to effective curing light, such as on the order of 5-20 seconds, the present system of providing ammunition allows for high-volume munitions production, enabling a production rate that has heretofore been impossible using asphaltic emulsion-based sealant or the anaerobic sealant approaches described in the background of the invention.

Figure 3:
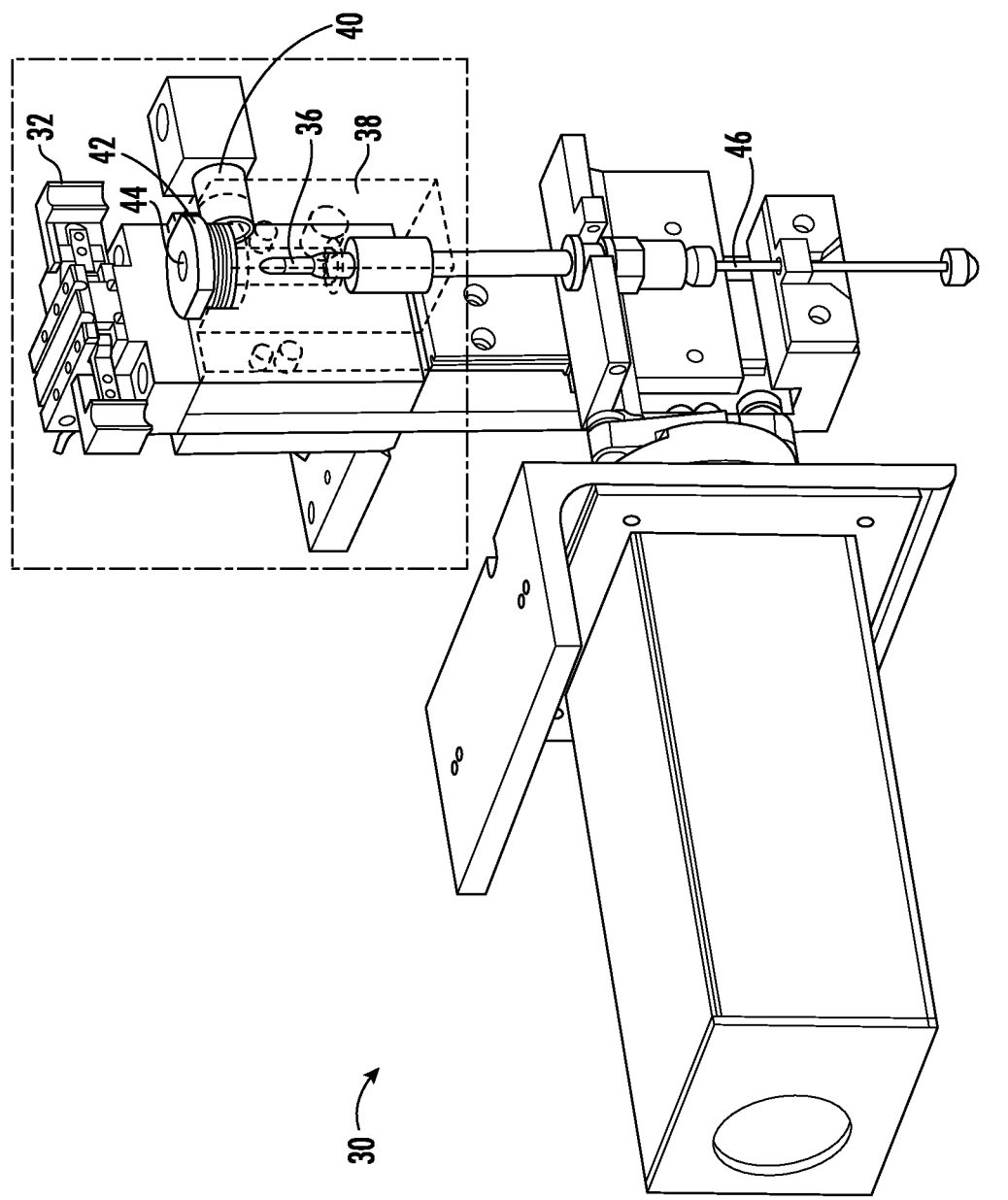
FIG. 3 is a sectional view of a liquid sealant applicator fixture of an automated assembly equipment line used to apply optical spectrum light-curable sealant to a cartridge case according to the present invention.
Figure 4:
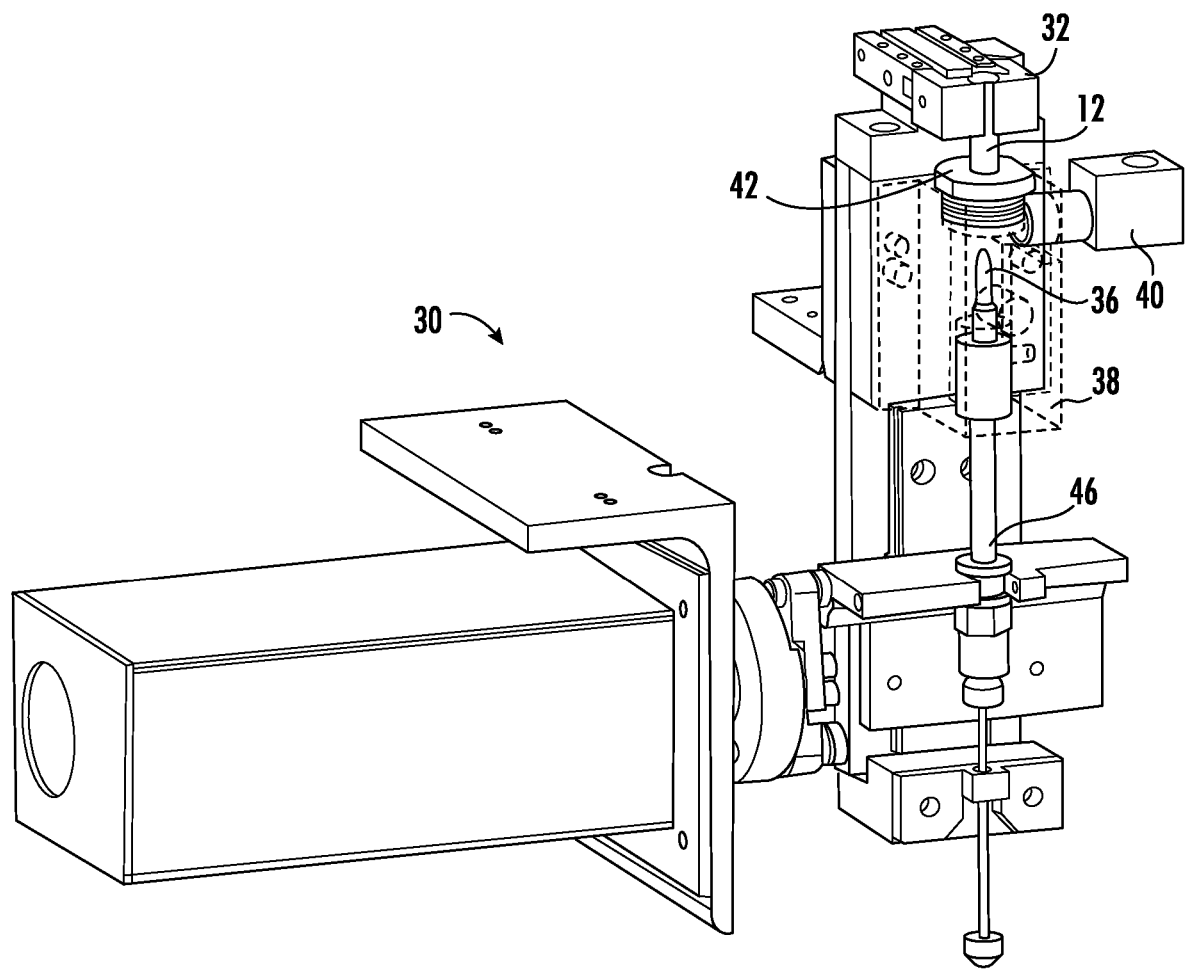
FIG. 4 is the liquid sealant applicator fixture illustrated in FIG. 3 with a cartridge case positioned for application of an optical spectrum light-curable sealant.

Referring now to FIGS. 3 and 4, a sealant applicator fixture generally designated 30 is illustrated. Sealant applicator fixture 30 can be used in an ammunition sealing system which includes one or more (preferably dozens) sealant applicator fixtures 30. Sealant applicator fixture 30 includes a case centering mechanism 32, moveable between an open position (FIG. 3) and a closed position capturing and centering cartridge case 12 (FIG. 4). Sealant applicator fixture 30 includes an applicator pin 36 carried in a chamber 38 indicated by broken lines to allow pin 36 to be seen. A sealant reservoir and dispenser 40 applies liquid sealant to pin 36 within chamber 38. A cap 42 including an aperture 44 closes the top of chamber 38. Applicator pin 36 is movable between a lowered position within chamber 38 and a raised position extending through aperture 44. When cartridge case 12 is positioned over aperture 44 by case centering mechanism 32, a lift assembly 46 moves applicator pin 36 to the raised position through aperture 44 into the mouth 14 of cartridge case 12 and applies a thin circumferential film of liquid light-curable sealant onto inner surface 24 of case 12. A more detailed description of sealant applicator fixture 30 is not provided as this is a known structure for the application of bitumen sealant and has been converted to the use of light-curable sealants. Use of a light-curable sealant results in the application of a more regular thin film layer and a much cleaner and safer environment.

It will be understood that while a pin applicator is used to apply the sealant in a preferred embodiment, an applicator can be of any suitable type. Examples include, without limitation, syringe pump dispensers, roller coaters, doctor blades, and liquid-fed transfer devices such as liquid-fed brushes, sponges, swabs, pads, etc. coupled in dispensing relationship with a reservoir or supply of the liquid sealant. The mounting, fixturing, support or positioning device(s) for such purpose can be mobile or stationary, as necessary or desirable in a given application of the invention. As an example, such device can include a conveyor belt that maintains the assembled ammunition articles in desired positions by suitable fixtures or jigs on the belt.

Figure 5:
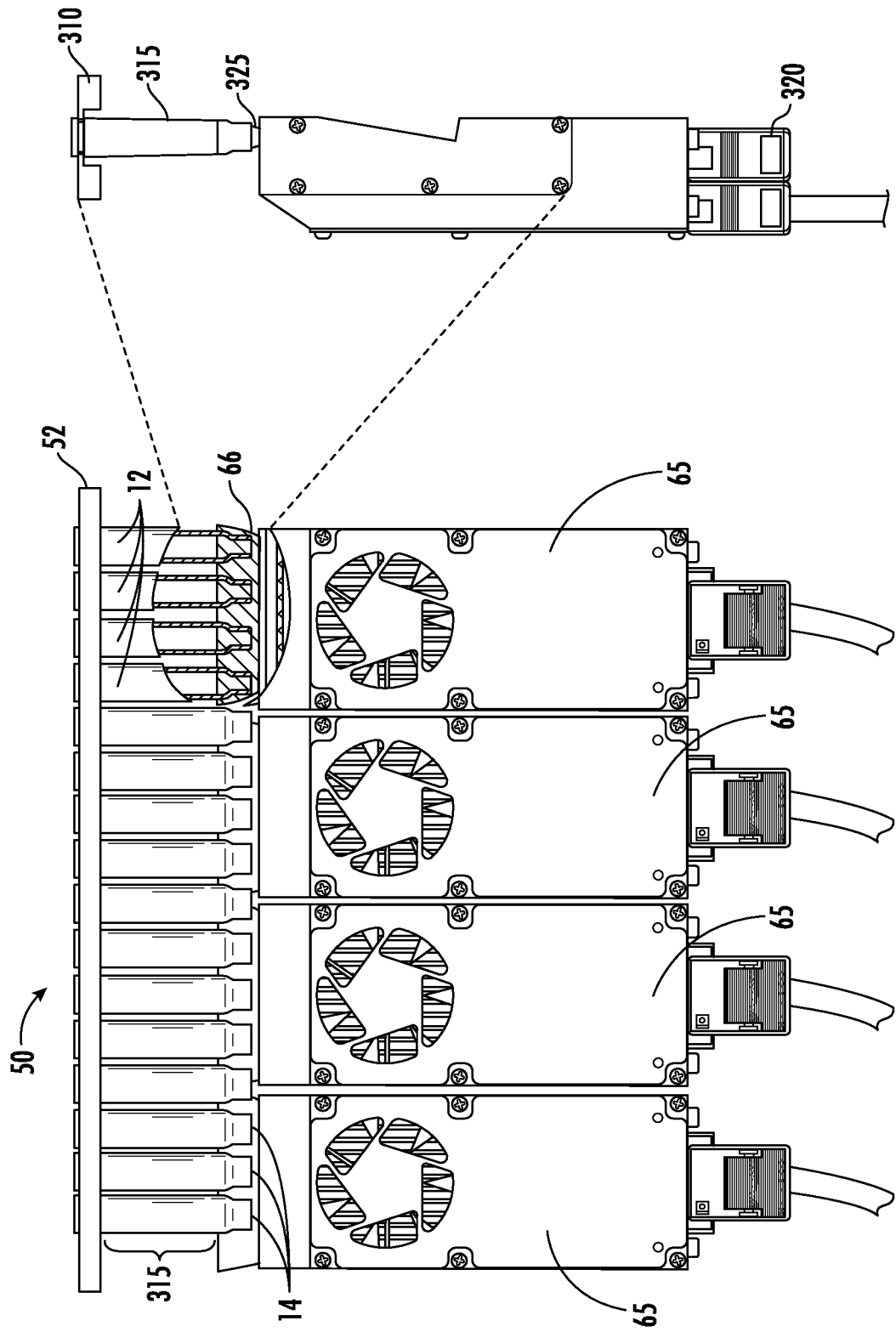
FIG. 5 is a schematic that represents an automated railing which carries multiple cartridges over light sources for curing the optical spectrum light-curable sealant.

Turning now to FIG. 5, a light-curable sealant curing system 50 is illustrated. Light-curable sealant curing system 50 includes a case hanging rail 52 to hold a row of ammunition cases 12, for example, with the casing mouths 14 facing downwards. One or more effective curing light sources 65 can be used to cure the liquid light-curable sealant, thereby providing a cured thin circumferential film layer having uniform thickness and coverage. One or more effective curing light sources 65 can further include a wavelength sensor so that the curing wavelength can be adjusted to a desired curing wavelength. After the application of the light-curable sealant to inner surface 24 of cartridge cases 12, cartridge cases 12 are loaded on case hanging rail 52. Case hanging rail 52 carries casings 12 over one or more effective curing light sources 65 positioned in close proximity to the row of cases 12. In the depicted embodiment illustrated in FIG. 5, four effective curing light sources 65 are positioned underneath casing mouth 14 and in close proximity thereto ensure efficient curing of the light-curable sealant. The dimension and position of the one or more effective curing light sources 65 can vary with the size and number of rows of cases 12. After liquid light-curable sealant is dispensed inside casing mouth 14 on inner surface 24, the one or more effective curing light sources 65 are used to cure the liquid sealant to produce a cured thin circumferential film layer. The cured thin circumferential film layer is sufficiently malleable to interact with a subsequently inserted projectile to form an air and moisture tight seal. In the depicted embodiment, the row of cases 12 is shown with the casing mouth 14 facing downwards. However, the row of cases 12 can be held in other suitable directions. Here the row of cases 12 is moved in a conveying fashion so that dozens of rounds of ammunition can be completed in a rapid and continuous manner.

The cartridge case hanging rail 52 can be configured to move the ammunition cases along one direction of the rail 52 (e.g., from a first rail end to a second rail end or from the second rail end to the first rail end) or both directions (e.g., from a first rail end to a second rail end and from the second rail end to the first rail end) such that each case will pass through the one or more effective curing light sources 65 to cure the liquid light-curable sealant, forming a cured thin circumferential film 66. Alternatively, or additionally, the one or more effective curing light sources 65 can be configured to move along one direction or both directions of the rail to cure the row of cases 12 section by section.

Once the sealant has been applied to the inner portion joint of the assembled ammunition article, the article bearing the curable sealant at the joint is exposed to light that provides an effective tackiness of the sealant. Preferably the light source(s) used is an LED source that utilizes a wavelength of 200-409 nm with intensity that provides light of spectral and intensity characteristics appropriate to the light-curing of the sealant, e.g., light in the visible, ultraviolet, UV-visible. UV and visible light, referred to herein as the optical spectrum, cured adhesives are designed to cure (harden) when exposed to specific wavelengths of light. UV Cure Adhesives are designed to cure when exposed to ultraviolet light. The typical wavelength range for UV curing is between 200 and 400 nanometers (nm). Within this range short-wave UV light (200-280 nm) is often used for sterilization purposes but is less common for adhesives due to potential safety concerns. The most effective range for UV cure adhesives is usually between 320 and 400 nm, with a peak around 365 nm. This range is often referred to as UVA or "near UV" light. Visible Light Cure Adhesives cure when exposed to visible light, typically in the range of 400 to 700 nm. The specific wavelengths' efficiency vary depending on the adhesive formulation. Some common wavelengths include blue light, around 400-450 nm, often used due to its effectiveness in curing adhesives and its relative safety compared to UV light. Longer wavelengths, up to around 500 nm (green light), may also be used, although the curing efficiency might decrease as the wavelength increases. The choice of wavelength depends on the specific formulation of the adhesive and the desired curing speed and depth. UV and visible light cure adhesives are popular in various industries due to their rapid curing times and strong bond strengths. However, the effectiveness of the curing process is highly dependent on the adhesive's exposure to the appropriate wavelength and intensity of light. In a preferred embodiment of the invention, the light is ultraviolet light. While an LED is preferred, the light source that is used to supply the effective curing radiation to the sealant formulation in the practice of the invention can be of any suitable type, including lamps, LEDs, photoluminescent media, down-converting and up-converting materials that respond to incident radiation in one electromagnetic spectral regime and responsively emit radiation of a longer or shorter wavelength, respectively, electrooptical generators, lasers, etc. In instances where the sealant comprises a UV-curable resin, the source of effective curing radiation is advantageously an ultraviolet lamp, of which numerous varieties are commercially available.

The light-curable sealant employed in the general practice of the invention can be of any suitable type. Preferably, the light-curable sealant composition is devoid of anaerobic sealing component(s). Illustrative sealants include formulations containing a curable resin such as an unsaturated polyester, epoxy, (meth)acrylate, urethane (meth)acrylate, (meth)acrylic ester monomer, oligoester acrylate-based compound, epoxy acrylate-based compound, polyimide-based compound, aminoalkyd-based compound, vinyl ether-based compound, etc.

Specific photopolymerizing monomers useful in the broad practice of the present disclosure include:

isobornyl acrylate

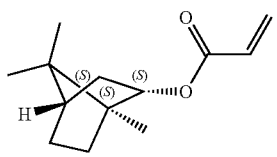

(1)

Relative stereochemistry shown

Ethoxy ethoxy ethyl acrylate

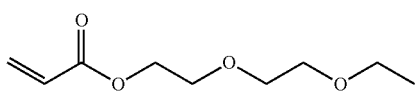

(2)

In general, any suitable fluid medium capable of solidification in response to the application of an appropriate form of energy stimulation may be employed in the practice of the present disclosure. Many liquid-phase chemicals are known that are convertible to solid-state polymeric materials by irradiation with ultraviolet light or exposure to other forms of stimulation, such as electron beams, visible or wavelengths outside the visible range.

The light-curable sealant formulations of the invention can contain any of various suitable photopolymerization initiator species, as appropriate to the specific light-curable materials employed in the formulation. Photoinitiators useful in the broad practice of the invention include photoinitiators commercially available from Ciba Specialty Chemicals, Inc. (Tarrytown, N.Y., USA) under the trademark IRGACURE, and CYRACURE-brand photoinitiators commercially available from Dow Chemical Co. (Midland, Mich., USA). More specifically for the present disclosure, the photoinitiator is 1-hydroxycyclohexyl phenyl ketone as provided in structure (3)

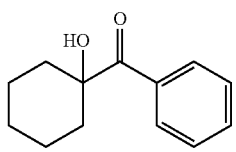

(3)

In addition to the light-curable resin(s) and photoinitiator, sealant formulations of the present invention can usefully comprise any other additives, adjuvants and other ingredients that benefit the formulation, application, curing and/or sealant properties of the formulation and do not preclude the utility of the formulation for its intended purpose of sealing the joint at the interface of the projectile and casing to render the joint resistant to moisture penetration into the interior of the casing. Such other ingredients may variously include, without limitation, solvents, dispersing agents, dyes, antioxidants, diluents, adhesion enhancers, viscosity-adjustment agents, fillers, extenders, etc., as well as exotic additives, such as microparticulate/nanoparticulate radio frequency identification (RFID) tags for forensic and military/police tracking of munitions, as an adjunct to conventional ballistics determinations. The sealant composition is preferably formulated so that after exposure to effective curing light, the composition may fluoresce for ease of detection.

In general, solvent-free sealant formulations are preferred, comprising photocurable resin(s) and photoinitiator, optionally with minor amounts of monomeric diluent and/or dye components. The photoinitiator may be employed at any suitable concentration. In one embodiment, the photoinitiator may be present in the sealant formulation at a concentration of less than 5% by weight, based on the total weight of the formulation. Diluent species, when present, are generally at concentrations of less than 10% by weight, based on the total weight of the sealant formulation, and dye ingredients, when present, are typically used at concentrations of less than 1% by weight, on the same total formulation weight basis, although any suitable concentrations can be employed for such diluent and dye ingredients. Dyes when used are of any suitable type, e.g., oil soluble Sudan types.

Viscosity of the sealant formulations in the broad practice of the invention can be at any suitable level consistent with effective usage of the sealant formulation. The choice of a given viscosity for a particular formulation may be readily made on the basis of simple experiment varying the viscosity by adjustment of the relative proportions of the ingredients of the formulation and determining the suitability of the formulation for the selected application technique, and the sealing action of the formulation at the projectile/casing interface. Any suitable viscosity may be employed. In one embodiment of the invention, sealant formulations are employed having formulation viscosities in a range of from about 25 to about 1000 centipoise (cps) at 25° C.

It will be recognized that the sealant in accordance with the present invention is a moisture-resistant barrier, and not a bondant or structural adhesive. Accordingly, the sealing of the interface between the casing and the projectile of the ammunition article should not significantly impede the separation of the projectile from the casing incident to the detonation of the powder charge held in the casing. This criterion can be satisfied by simple tensile testing, to determine the tensile strength that is required to separate the projectile from the casing in the absence of the sealant at the joint, and with the sealant at the joint, in corresponding comparative assembled ammunition articles.

Figure 6:
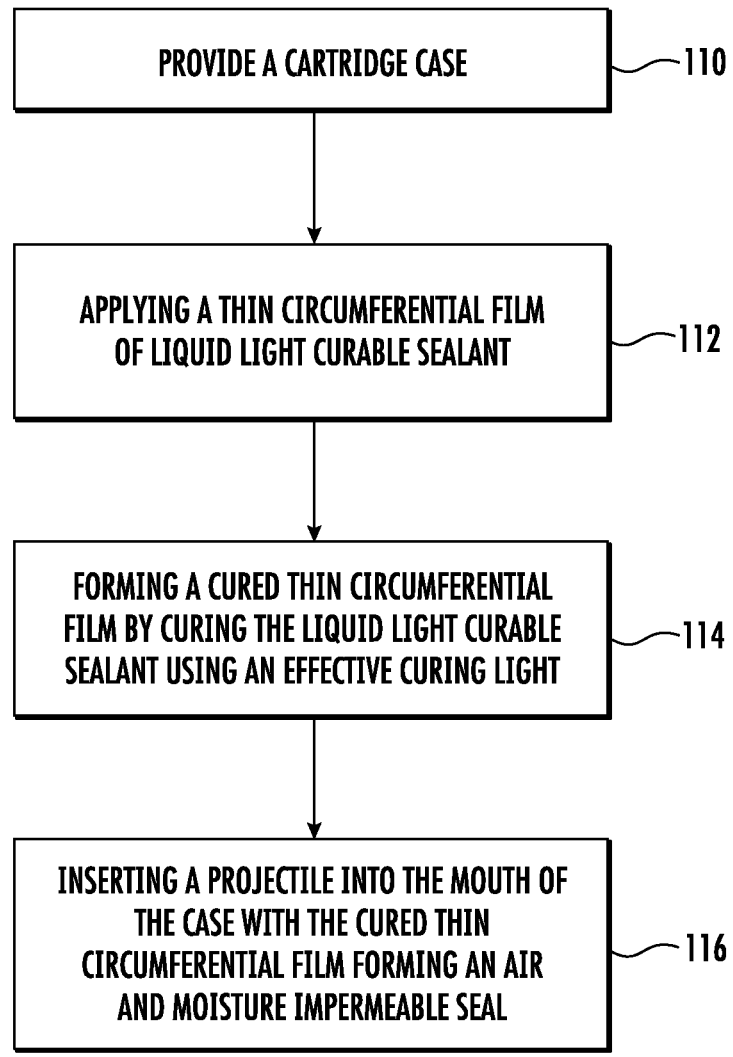
FIG. 6 is a flow chart of a method of assembling ammunition cartridges according to the present invention.

Turning now to FIG. 6, with additional reference to FIG. 1 and FIG. 2, a flow chart of a method for assembling ammunition cartridges is illustrated. The method includes providing 110 cartridge case 12 and applying 112 a thin circumferential film of a liquid light curable sealant to inner surface 24. The thin circumferential film of light curable sealant is then cured 114 using an effective curing light from the optical light spectrum to produce a cured thin circumferential film on inner surface 24. Other elements of the cartridge 10 such as a powder charge and primer are assembled with cartridge case 12. Projectile 16 is then inserted 116 into mouth 14 of case 12. Cured thin circumferential film on inner surface 24 has sufficient malleability to form an air and moisture impermeable seal 18 between cartridge case 12 and projectile 16 when projectile 16 is inserted. This provides a sealed and functional ammunition cartridge or other ammunition article.

The ammunition article, as thus finished, may be packaged, stored, transported and ultimately used, without penetration of moisture into the joint between the casing and the projectile. The features and advantages of the disclosure are more fully shown with reference to the following example wherein all parts and percentages are by weight, unless otherwise expressly stated.

A commercially available sealant such as Hernon Ultrabond® is employed in a preferred embodiment. This sealant is a UV sealant newly intended to replace bitumen in a "SCAMP" line which is an automated manufacturing line designed for (in this case) the mass production of 5.56 caliber ammunition. Benefits over the asphalt-based sealant currently used:
1. Can be used in the existing equipment (SCAMP Line) without any modification to the application equipment.
2. 100% solid system.
3. Cures on command.
4. Nonflammable.
5. Does not present an air quality hazard that requires ventilation in production.
6. Tack free time (can be loaded quickly) speed 5-20 seconds.
7. The sealant application offers inline vision inspection.
8. Elimination of the need for staging of the coated cartridges.
9. No sensitivity to the percentage of moisture and temperature in the production environment.
10. No time sensitivity to load cartridges after application of the coating.
11. No shrinkage due to solvent evaporation.
12. Clean and not messy operation.
13. The sealant can stay in the machine for more than a week without purging and cleaning requirement.
14. Lower cost of transportation and storage.
15. Smaller footprint results in cost reduction.
16. Significantly improves gun barrel contamination from the residue of the sealant.

Thus described is a method and system for sealing ammunition cartridges using a light cured sealant. The sealant is applied to the inner surface of the mouth of a cartridge case and cured prior to the positioning of a projectile. Curing of the sealant does not use removal of a solvent in a drying process which can result in an irregular layer, so the cured sealant has a uniform and repeatable cured sealant layer for superior ammunition cartridge assembly.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A method of sealing an ammunition cartridge during an ammunition manufacturing process, the method comprising the steps of:
   providing a cartridge case having a projectile receiving mouth with an inner surface;
   applying a thin circumferential film of a liquid light curable sealant to the inner surface;
   forming a cured thin circumferential film by curing the thin circumferential film of liquid light curable sealant using an effective curing light from an optical light spectrum; and
   assembling the ammunition cartridge including inserting a projectile into the mouth of the cartridge case with the cured thin circumferential film forming an air and moisture impermeable seal between the inner surface and the projectile.

2. The method as claimed in claim 1 wherein the step of applying the thin circumferential film of liquid light curable sealant to the inner surface includes applying the liquid light curable sealant with an automated applicator fixture.

3. The method as claimed in claim 1 wherein the step of curing the thin circumferential film of liquid light curable sealant includes providing an effective light curing source and positioning the mouth of the cartridge proximate the effective light curing source.

4. The method as claimed in claim 1 wherein the step of using effective curing light includes selecting the effective curing light from the optical light spectrum having wavelengths from 200 nm-700 nm.

5. A system for sealing an ammunition cartridge during an ammunition manufacturing process, the system comprising:
   a plurality of cartridge cases each having a projectile receiving mouth with an inner surface;
   a liquid sealant applicator fixture sequentially receiving each of the plurality of cartridge cases and applying a thin circumferential film of a liquid light curable sealant to the inner surface of each of the plurality of cartridge cases;
   an effective curing light source sequentially positioning proximate each mouth of the plurality of cartridge cases;
   a cured thin circumferential film formed on the inner surface of each of the plurality of cartridge cases from the thin circumferential film of liquid light curable sealant subjected to the effective curing light from an optical light spectrum; and
   a projectile inserted into each of the plurality of cartridge cases having the cured thin circumferential film formed on the inner surface thereof to form an air and moisture impermeable seal between the inner surface and the projectile of each of the plurality of cases.

6. The system as claimed in claim 5 further including a case hanging rail receiving each of the plurality of cartridge cases having thin circumferential film of a liquid light curable sealant from the liquid sealant applicator to move each proximate the effective curing light source and positioning the mouth of the cartridge proximate the effective curing light source.

7. The system as claimed in claim 5, wherein the liquid light curable sealant is a fluid before curing and wherein said liquid light curable sealant becomes malleable after curing.

* * * * *